United States Patent [19]

Fickelscher

[11] Patent Number: 4,764,095

[45] Date of Patent: Aug. 16, 1988

[54] ROTARY SLIDE COMPRESSOR WITH THIN-WALLED, DEFORMABLE SLEEVE

[76] Inventor: Kurt G. Fickelscher, Herderstrasse 19, D-6710 Frankenthal, Fed. Rep. of Germany

[21] Appl. No.: 938,208

[22] Filed: Dec. 4, 1986

[30] Foreign Application Priority Data

Dec. 4, 1985 [DE] Fed. Rep. of Germany ....... 3542776

[51] Int. Cl.$^4$ ................. F04C 5/00; F04C 18/348; F04C 29/10
[52] U.S. Cl. ..................... 418/31; 418/156; 418/173; 418/184; 418/185; 418/187; 418/238
[58] Field of Search ............... 418/184, 187, 188, 173, 418/156, 27, 31, 185, 186, 236, 238

[56] References Cited

U.S. PATENT DOCUMENTS

| 983,754 | 2/1911 | Nichols | 418/185 |
|---|---|---|---|
| 1,988,213 | 1/1935 | Ott | 418/173 |
| 3,272,138 | 9/1966 | Connoy et al. | 418/27 |
| 4,514,156 | 4/1985 | Sakamaki et al. | 418/173 |
| 4,580,957 | 4/1986 | Fickelscher et al. | 418/57 |

FOREIGN PATENT DOCUMENTS

| 1286068 | 1/1961 | France . | |
| 1548031 | 12/1967 | France . | |
| 225748 | 8/1985 | German Democratic Rep. | 418/31 |

Primary Examiner—John J. Vrablik
Assistant Examiner—Leonard P. Walnoha
Attorney, Agent, or Firm—Foley & Lardner, Schwartz, Jeffery, Schwaab, Mack, Blumenthal & Evans

[57] ABSTRACT

An apparatus, particularly for compressing and conveying fluids, comprising a rotor (1) and a thin-walled rotary sleeve (7) which is rotatably arranged eccentrically with respect to the axis (M1) of the rotor and which is in surface contact with the surface of the rotor throughout a predetermined angular range ($\phi$). At least one separator slide (12) is provided between working chambers (S, D) the volumes of which vary when the rotary sleeve rotates. The apparatus is constructed such that the fluid throughput and the speed of rotation can be increased compared to conventional devices, so that a device of given capacity may have smaller dimensions and a lower weight. To achieve this it is proposed that the rotary sleeve (7) be supported in a bearing support (110) by at least one bearing (125) and be pressed thereby against the circumferential surface of the rotor (1), and that the rotor (1) be rotatably mounted around a control tube (3) and contact the inner surface of the rotary sleeve (7) in the predetermined angular range ($\phi$). The rotary sleeve (7) cylindrically embraces the rotor (1) in the predetermined angular range ($\phi$) and is driven by the rotor through frictional engagement.

29 Claims, 11 Drawing Sheets

ROTARY SLIDE COMPRESSOR WITH THIN-WALLED, DEFORMABLE SLEEVE

BACKGROUND OF THE INVENTION

The invention relates to an apparatus particularly a working machine for compressing and conveying fluids, having a rotor with a thin-walled rotary sleeve which is arranged eccentrically to the axis of the rotor and contacts the circumferential surface of the rotor through an angular range, and with at least one separator slide between work spaces or chambers, whose volume is variable upon rotation of the rotary sleeve.

U.S. Pat. No. 4,580,957 discloses an apparatus of this type, whose rotary sleeve or annular piston has a larger diameter than the piston, which is constructed as a fixed housing. The rotary sleeve is mounted in a circular drive ring, the inner space of which is displaced eccentrically of the piston housing. A spring loaded separator slide produces working chambers which vary in volume when rotation occurs, whereby the medium to be conveyed is aspirated and expelled once per revolution. The maximum possible intake volume per revolution is determined by the relationship of the diameters of the rotary sleeve and the piston. Because of the tightly crowded spatial relationships in the stationary piston housing, under practical conditions only diameter differences of from 10 to 12% can be meaningfully realized. Further, the maximum speed of rotation is limited by the follower spring arranged in the piston housing, which spring has to have a high spring tension if the follower must be extended at high frequencies. The maximum speed of rotation of this known machine is approximately 4000 revolutions per minute. A further limitation of the maximum speed of rotation is determined by the limiting speed of rotation of the roller bearings, which surround the rotary sleeve radially outwardly. Because of the additional deformation in the rolling contact region, the limiting speed of rotation of the standard roller bearing must be reduced. Further, the machine requires careful counterbalancing, particularly at higher speeds of rotation. On the other hand, with the previously known machine, pressures up to 10 bar or vacuums up to 10 millibar can be produced in a single stage, and this can be achieved with the complete absence of oil from the working chamber. The heat of compression can be conducted away in a simple manner, and the friction losses are small, so that the specific power requirement is 20 to 30% lower than in other types of construction. The previously known machine, particularly when constructed as a rotary sleeve compressor in accordance with FIG. 22 of the aforementioned U.S. patent, offers significant advantages compared to comparable machines with other types of construction because of a thermal behavior which is favorable due to the absence of loss spaces, because of the possibility of internal and external cooling, and because of low frictional losses and a consequent low power requirement.

Thus, U.S. Pat. No. 4,514,156 discloses a compressor with a rotary sleeve which has a relatively large wall thickness and is mounted in a stationary housing by an air bearing. Within the rotary sleeve a rotor is eccentrically arranged, which has a smaller diameter than the rotary sleeve and contains four radially movable separator slides or vanes. The substantially rigid rotary sleeve lies with its inner surface in contact with the outer surface of the rotor practically only along a line. A compressor of this type requires extremely precise fabrication, especially since the radial gap width of the air bearing should be less than 0.1 mm in size.

Further, French Pat. No. 1,286,068 discloses a compressor with a practically rigid, thick-walled rotary sleeve, which is mounted in a housing by roller bearings at each of its axial ends. The rotor arranged radially inside the rotary sleeve contains two diametrically opposed separator slides, which are supported with respect to each other by a spring. The rotor again lies in contact with the inner surface of the rotary sleeve practically only along a line of contact, so that difficulties result, primarily with regard to sealing and to wear.

French Pat. No. 1,548,031 also relates to a compressor with a thick-walled rotary sleeve and a rotor arranged radially inside the sleeve. Because of the aforementioned difficulties, a layer of carbon or polytetrafluoroethylene is arranged on the inner surface of the rotary sleeve.

SUMMARY OF THE INVENTION

The invention is based on the object of further improving an apparatus of the aforedescribed type with a low cost of construction in such a way that an increased fluid throughout is made possible and also the drive speed of rotation can be increased. It should be possible to increase the eccentricity of the rotary sleeve while maintaining a high degree of functional reliability, whereby small overall measurements and a low weight should be achieved. The apparatus should be usable as a turbocharger compressor in motor vehicles and consequently should require a small amount of space and weight. Springs for producing following movements of separator slides or the like should be omitted. High attachment loads of the components, and particularly of the rotary sleeve, the rotor and the bearings, should be reduced. Finally, the machine should have a low noise of operation and a long operating life.

These and other objects of the invention are achieved by providing an apparatus for compressing and conveying fluids, comprising a rotor which rotates about an axis, a thin-walled, deformable rotary sleeve which is rotatably arranged eccentrically to the rotor axis in surface to surface engagement with the circumferential surface of the rotor throughout a predetermined angular range $\phi$, and at least one separator slide defining working chambers which vary in volume when said rotary sleeve is rotated, wherein said rotary sleeve is supported by at least one bearing in a bearing support and is pressed by said bearing support against the circumferential surface of said rotor so that said rotor is partially embraced cylindrically by said sleeve in said predetermined angular range $\phi$, wherein said rotor rotates around a control tube and contacts the inner surface of said rotary sleeve throughout said predetermined angular range $\phi$, and wherein said rotary sleeve is drivable by said rotor through frictional engagement.

According to the invention it is proposed that the rotary sleeve be mounted in a bearing support by a deformable roller bearing, that the rotor or rotary piston be rotatable around a control tube and contact the inner surface of the rotary sleeve throughout a predetermined angular range, and that the rotary sleeve which embraces or encloses the surface of the rotor or rotary piston in this predetermined angular range be drivable by the rotor through a frictional connection.

The apparatus of the invention is distinguished by a simple construction and by an increase in the specific fluid throughput. The rotor or rotary piston is rotatably mounted radially and axially on a fixed, stationary control tube and can be driven by belts or by direct coupling. The rotary piston contains separator slides, preferably two of them, which are arranged tangentially to the control tube, are actuated by centrifugal force, and produce two cycles per revolution. The thin-walled rotary sleeve is arranged eccentrically with respect to the rotor or rotary piston and is pressed against the rotary piston by the roller bearings as a result of the configuration of the bearing support. For simplicity of description, the rotatable piston will be referred to hereinafter as the rotor. The rotary sleeve embraces the surface of the rotor throughout an angular range of predetermined size. An angular range on the order of 60° in size has been found advantageous. The rotary sleeve is driven force keyed and form keyed as a result of the resilient pressure when the rotor rotates. The rotary sleeve rotates in the same direction and at the same circumferential speed as the rotor, whereby the angular speed differs from that of the rotor in accordance with the difference in diameters. Through the two tangentially arranged separator slides, the eccentricity can be increased to approximately 20-25% of the diameter difference. Further, the maximum aspiration volume or intake volume of each working chamber which lies in crescent shape between the separator slide, the contact surface of the rotary sleeve and the rotor, is increased. As a result of the embracing of the rotor by the rotary sleeve in the predetermined angular range of approximately 60° of angle, the intake slots arranged in the vicinity of the separator slides on the outer surface of the rotor are closed until the working chamber or aspiration chamber has increased by about 30° in size over the 180° rotation. Similarly, since two intake operations take place per rotation of the rotor through 180°, the intake volume also increases twice by the amount delta V. Since this volume increase takes place in the region of the greatest spacing of the rotor from the rotary sleeve, there results in accordance with the invention an increase in volume of approximately 50-60% in comparison to the intake volume resulting only from the diameter difference.

In the fixed or stationary control tube, which simultaneously serves for mounting the rotor, an outlet slot is arranged, which is opened by the control edge of the rotor when the desired end pressure is reached, so that compressed gas is conveyed away through the opening of the control tube in the end face of the compressor. The desired end pressure can be adjusted by turning the control tube. This embodiment requires neither springs nor valves. Weight balancing is not necessary.

Air entry takes place through openings arranged laterally in the piston flanges which rotate therewith.

A further increase of the intake volume by about 80% of the theoretical volume is possible when the direction of flow is reversed. The air is thereby drawn in through the central control tube. Axial through bores are arranged in the rotor immediately in front of the separator slides, which bores are in communication with the compression chamber through slots or bores in the outer jacket of the rotor and are closed during the intake step by appropriately formed spring valves. After completion of the intake step, the aspiration chamber is separated from the pressure chamber by control slots. The compressed air exits laterally out the flanges which rotate therewith.

This embodiment in its simplest form is especially well suited for oil-free vacuum operation.

The attainment of high drive speeds of rotation, which can amount up to about 10,000-12,000[1] due to the low friction speeds, requires a new bearing arrangement. The highest speed of rotation of a standard roller bearing is limited in the first instance by the sliding friction in the bearing cage. Thus, for example, the limiting speed of rotation of a bearing with an inner diameter $d=100$ lubricated with oil amounts to approximately n max.$=4000$ min$^{-1}$.

If the bearing is additionally deformed, the gap spaces between ball and bearing cage are reduced, whereby the limiting speed of rotation is decreased by approximately 10-20%.

The newly developed roller bearing comprises a thin-walled outer ring and a thin-walled inner ring. Alternatively, in place of the thin-walled inner ring, the bearing may run directly on the rotary sleeve. Arranged between the two rings are standard small roller bearings, which are secured by means of shafts in elastic guide rings arranged laterally outside of the bearing region. In this way the sliding friction between ball and cage is avoided, and the full limiting speed of rotation of the small roller bearings can be utilized. The roller bodies of the individual bearings are hardly radially loaded at all since the supporting forces act oppositely on the outer ring of the roller bearing. The roller bodies are merely loaded by small return forces when the elastic guide ring is additionally deformed as well as by small holding forces for maintaining the spacing distance.

Standardized roller bearings with lateral seals can advantageously be utilized to produce oil-free pressurized air.

The limiting speed of rotation of a bearing of this type with dimensions of 100/140 $\phi$ amounts to approximately 12,000 rpm.

The production costs are lower than for standard bearings.

BRIEF DESCRIPTION OF THE DRAWINGS

The invention will be explained in further detail hereinafter with reference to working embodiments illustrated in the accompanying drawings, wherein.

DETAILED DESCRIPTION OF PREFERRED EMBODIMENTS

Figure 1:
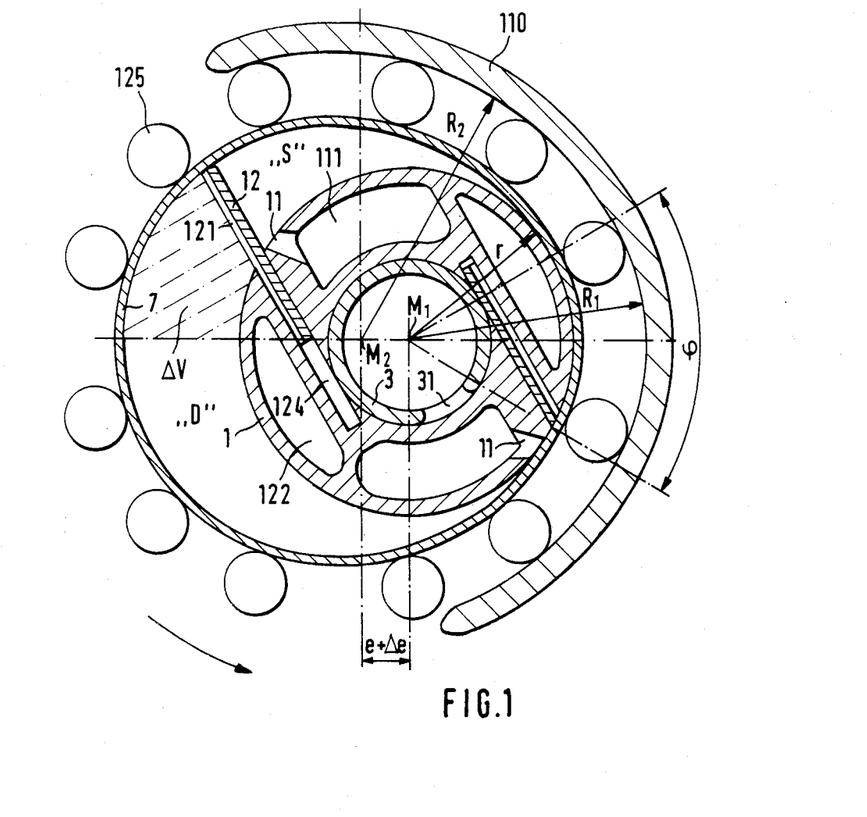
FIG. 1 shows a schematic and somewhat enlarged cross-section through an apparatus according to the invention.

FIG. 1 shows schematically a cross-section through a first preferred embodiment of the apparatus of the invention at the moment of maximum intake at the onset of compression—Chamber D—and simultaneous aspiration or intake -Chamber S. The rotor 1 is rotatably mounted centrally on a control tube 3 which has a radial opening or pressure slot 31. Two opposing separator slides 12, guided in slots 124 which are arranged tangentially with respect to the control tube, create working chambers which vary in volume when rotation occurs. The chambers are divided into an aspiration or suction chamber (S) and a pressure chamber (D). Immediately behind the separator slides 12, intake slots 11 connect the intake openings 111 in rotor 1 to the aspiration chamber of the apparatus. The separator slides, provided with air slots or channels 121, are urged sealingly against the rotary sleeve 7 as a result of centrifugal force when rotation occurs and slide there with a relative speed corresponding to the diameter difference between the rotor and the rotary sleeve, which relative speed amounts to approximately one-fifth of the peripheral speed when the diameter difference is approximately 20%. Guide slots 124 in rotor 1 are open on the side facing the control tube, so that when they cut across the control opening 31, the compressed gas is exhausted through the central bore of the control tube. The inner diameter of the rotor 1 is slightly larger than the outer diameter of the control tube 3 and thus acts as a throat or throttle. The axis of rotation M2 of the rotary sleeve is spaced from the center M1 of the rotor by a distance e (which corresponds approximately to half the diameter difference) and by a distance delta e resulting from the deformation of the rotary sleeve 7 in angular region $\phi$.

Through a bearing support body 110 which is open toward the aspiration side of the apparatus, an elastic roller bearing 125 is deformed circumferentially such that in the roll off region an enclosure angle of approximately 60° is generated in which an intake slot 11 is sealingly covered as it passes therethrough. The intake volume is hereby increased by delta V (shown crosshatched in FIG. 1).

In order to achieve this, the radius of curvature R1 of the bearing support body 110 within an angular range of approximately 60° and the radius of curvature r of the rotor lie at a common center point M1, which simultaneously is the axis of rotation of the rotor. The further course of curvature R2 of the bearing support body 110 is designed according to the invention in such a way that it substantially corresponds to the natural course of curvature which arises as a result of the reduction in the radius of curvature of the rotary sleeve. Cooling chambers 122 are arranged in the rotor 1 for conducting away internal heat.

In FIG. 1 the increased intake volume $\Delta V$ is illustrated with crosshatching. In the position in which rotor 1 is shown, the compression is just beginning in chamber D. The inlet opening 11 shown at the right of the figure has just been covered by rotary sleeve 7.

If the rotary sleeve 7 were not pressed against the rotor 1 in accordance with the invention, then only a single line of contact would exist between the rotary sleeve and the rotor. This line would lie in the plane depicted by the horizontal broken line extending through the two midpoints M1 and M2. Consequently, the compression could not begin until the inlet opening 11 had rotated further an amount corresponding to about half the angle between its illustrated location and the aforementioned plane. The outer sealing edge of the separator slide 12 shown at the left of the figure would then lie approximately in the aforementioned horizontal plane before compression could begin, and the crosshatched volume $\Delta V$ would not be included in the compressed volume.

As compression is just starting in chamber D as illustrated in FIG. 1, fluid is already being drawn into the other chamber S through the other inlet opening 11 shown at the left of the figure. It is apparent that the intake cycle for chamber S began as soon as the left inlet opening was released by rotary sleeve 7. The left inlet opening 11 in FIG. 1 is shown approximately 90° through the intake cycle and still has approximately 180° of rotation to go before the inlet opening reaches a point at which it is closed off by rotary sleeve 7.

The compression mechanism of the apparatus will be explained with reference to FIGS. 2 and 3, in which the central control tube is designed as a pressure control tube.

Figure 2:
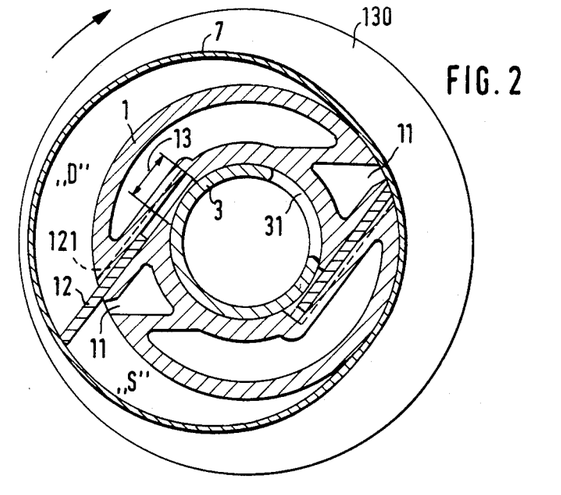
FIG. 2 schematically shows a cross-section of an apparatus according to the invention with a pressure control tube at the outset of compression.
Figure 3:
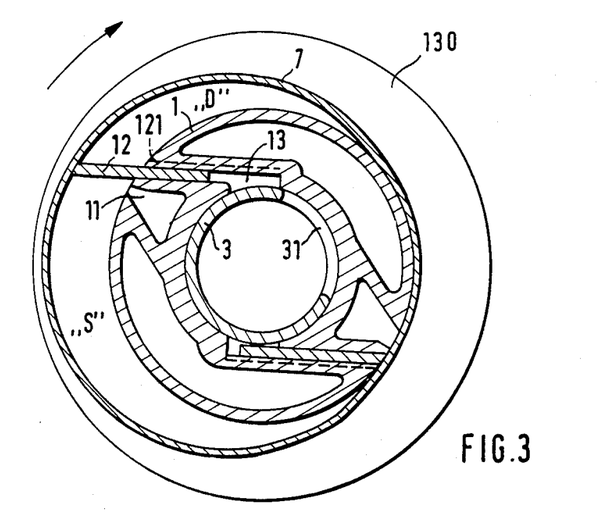
FIG. 3 shows the apparatus of FIG. 2 at a compression ratio of 1:2.5 and maximum intake.

FIG. 2 at the onset of compression, after the right inlet opening 11 in rotor 1 is closed by the reduced curvature of the rotary sleeve 7, begins the compression for so long until the forward edge of the pressure slot 13 arranged in rotor 1 open toward the control opening 31 crosses over the leading edge of the control opening (FIG. 3). At the point in time when compression begins, the rear edge of the pressure slot 13 at the right side of FIG. 2 closes the control opening 31. Through the throttle effect as a result of the small diameter difference between the bore in the rotor and the outer diameter of the control tube, any significant backflow of the compressed gasses is prevented. At the same time, gas is drawn in across the rear surface of separator slide 11.

FIG. 3 shows the apparatus at a compression ratio of about 1:3 at the moment control slot 13 crosses over the rear edge of control opening 31. The compressed gas then escapes through the bore in control tube 3. The largest intake volume is also achieved in this position. The supplement volume delta V is conveyed twice in one revolution.

As a result of the absence of springs and valves, this type of construction is not sensitive to the presence of fluids which may be conveyed with the compressed gas, and accordingly it is well suited for oil injection, by means of which one can extract the heat of compression during compression in a similar manner as in screw compressors. Simultaneously, when oil is present, the throttle effect in the gap between the rotor and the control tube 3 is improved. The compression chamber is bounded in the axial direction by two lateral piston flanges 130. The oil circulation of a rotary sleeve compressor is smaller than in a screw compressor in which the oil, in addition to carrying away heat, is also heated by the flank friction and significant gas backflows. The specific power requirement of the rotary sleeve compressor with the new type of construction is approximately 20–30% lower than in a screw compressor.

When oil is injected, the rotary sleeve compressor can generate compression ratios up to 1:16 with appropriately formed bearings. At the same time, when oil is injected, the machine is in a position to generate vacuums up to 1 millibar.

Figure 4:
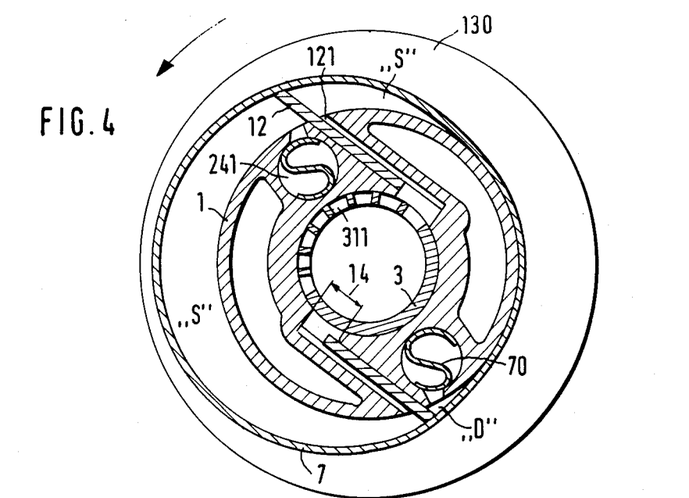
FIG. 4 shows schematically an arrangement with a suction tube and S-formed pressure valves at maximum intake.
Figure 5:
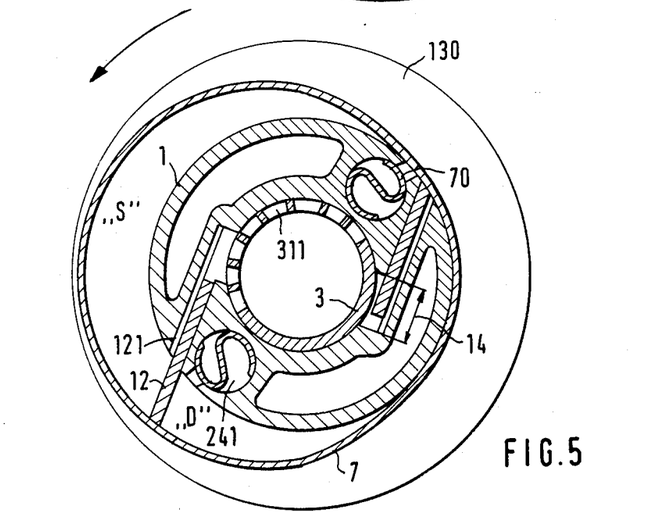
FIG. 5 shows the apparatus of FIG. 4 at a compression ratio of approximately 1:3.

FIGS. 4 and 5 illustrate the compression mechanism of an apparatus controlled by pressure valves with reversed rotation and flow directions. FIG. 4 shows the machine after reaching the maximum intake volume. The aspirated gas volume is enclosed by the two separator slides 12. The upper pressure valve 70 is closed; the rear edge of the intake opening 14 in the rotor 1 has covered the inlet opening 311 in the control tube, while the inlet opening 14 of the upper separator slide 12 is already open for aspiration until the gas enclosed in the pressure chamber is substantially completely exhausted through the S-form valve 70.

For admitting gas, there are interrupted slots or channels 121 in the rotor 1.

FIG. 5 shows the compression mechanism at a compression ratio of approximately 1:3. The compressed gas exits laterally through the valves 70, which rotate with the apparatus, and through pressure bores 241. This compression mechanism increases the throughput volume by about 80% compared to the theoretical volume and is particularly suitable for oil-free operation as a vacuum pump as well as in the blower area due to the large air throughput up to a pumping pressure of approximately 3 bar.

Figure 6:
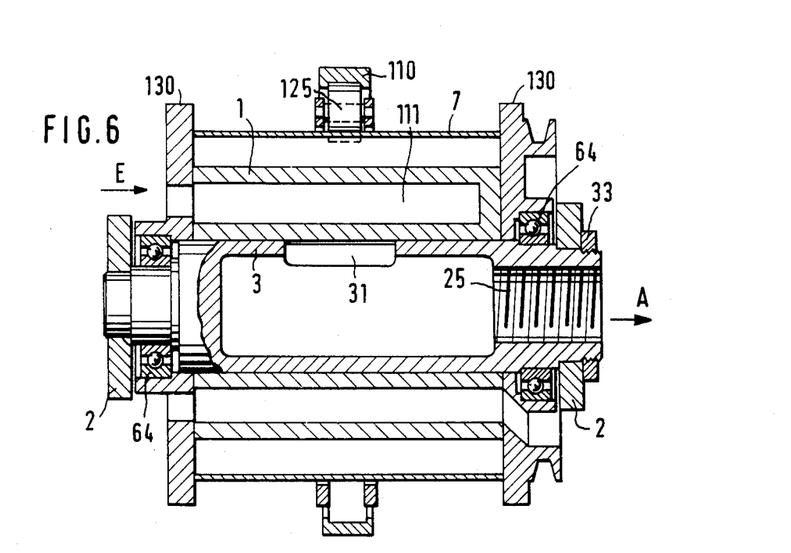
FIG. 6 shows a longitudinal section through an apparatus for belt drive with a conveying mechanism according to FIGS. 1, 2 and 3.

FIG. 6 shows a longitudinal section through a machine with the simplest type of construction with a belt drive. The central pressure control tube 3 carries the rotor 1 via roller bearings 64. The control tube 3 is secured to the housing bracket 2 by a ring nut 33. By loosening the nut 33, the control tube 3 including its control opening 31 can be adjusted in the circumferential direction, whereby varying pressure relationships can be set without reconstructing the device. The rotary sleeve 7 is arranged around the rotor as described in conjunction with FIG. 1, and is pressed against the rotor 1 by the drive bearing 125. The outer ring of drive bearing 110, which in turn is connected by screws to the housing bracket 2.

The rotor 1 carries piston flanges 130 at both ends with inlet openings 111. The drive takes place through a belt drive for which the rotor flange 130 is utilized. The gas is drawn in through openings 111 in rotor flange 130 which rotates therewith. The pressure control tube 3 is provided with a threaded bore or fitting 25 for connecting a pressure line.

Figure 7:
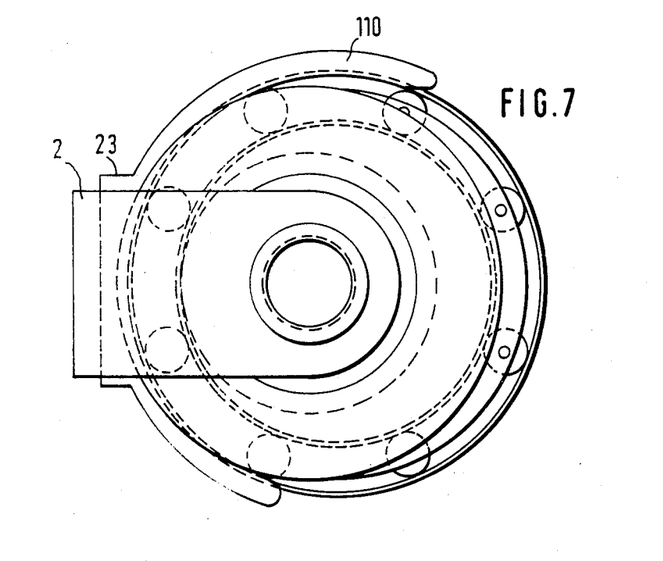
FIG. 7 shows an end elevational view of the apparatus of FIG. 6.

FIG. 7 shows an end elevation view of the machine of FIG. 6. The bearing support body or bow 110 is secured by means of a tenon 23 in the simply constructed housing bracket 2. The desired tension or prestress can be adjusted by intermediate plates between the parts.

Figure 8:
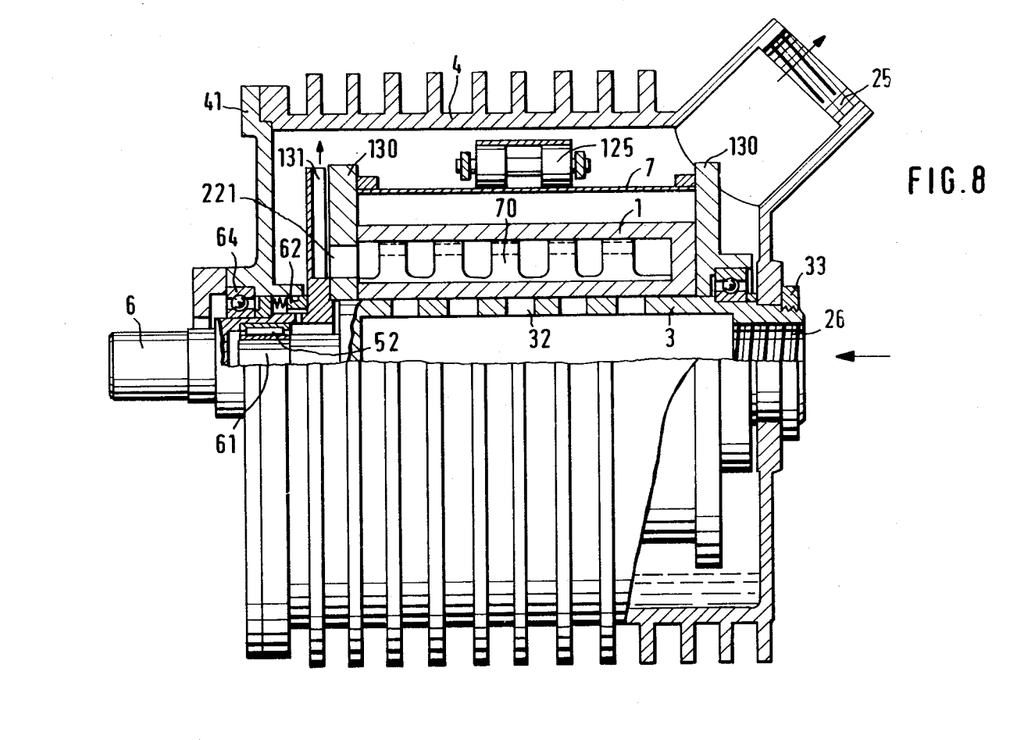
FIG. 8 shows a partial longitudinal section through an apparatus using the conveyor principle of FIGS. 4 and 5.

FIG. 8 shows a longitudinal section through an apparatus with the compression mechanism of FIGS. 4 and 5. The vacuum control tube 3 is secured in stationary housing 4 by means of ring nut 33. The other side of the control tube 3 has a trunnion 61, which is supported by a needle bearing 52 in a corresponding bore in the drive flange shaft 6. The drive shaft 6 is flanged together with the rotor 1, which in turn is supported on the suction side by means of a roller bearing 64 on the suction or intake tube 3. On the drive side, the rotor 1 is mounted in the housing cover 41 via the flange shaft 6 by means of roller bearings 64. The sealing of the drive shaft with respect to the compression chamber takes place through a sliding ring seal 62. The gas is drawn in through the suction support 26 and reaches the compression chamber through bores 32 which lie in the circumferential direction in the desired suction region of the suction tube 3.

The compressed gas leaves the rotor via the pressure valves 70 through the laterally arranged openings 221. The flanged shaft 6 is flanged together with the rotor flange 130, whereby the flange of the drive shaft 6 is formed so that an annular gap 131 is created together with the rotor flange 130. Through the rotation of the annular gap, the gas enters with a substantial angular momentum into the compression chamber, which is formed by the circular inner surface of the housing 4 and the outer surface of the rotary sleeve 7. Through the angular momentum, the gas is centrifuged outwardly against the cylindrical surface of the pressure housing 4. Through the superimposition of the longitudinal velocity, a spiral-form gas movement in the direction of pressure fitting 25 is created. An outstanding heat release is hereby effected to the housing, which is provided externally with cooling ribs, the entire cylindrical surface of which is available to carry off heat. In this embodiment, supplemental cooling can be omitted, particularly in the low pressure range.

The gas exiting laterally at high speed out the pressure openings 221 is delayed in the annular gap 131, whereby pulsations and the formation of noise upon exiting from the annular gap are significantly reduced. In an oil-lubricated machine, a centrifugal separation takes place at the gap outlet due to the high specific gravity of the oil. The annular gap can additionally be provided with vanes.

Figure 9:
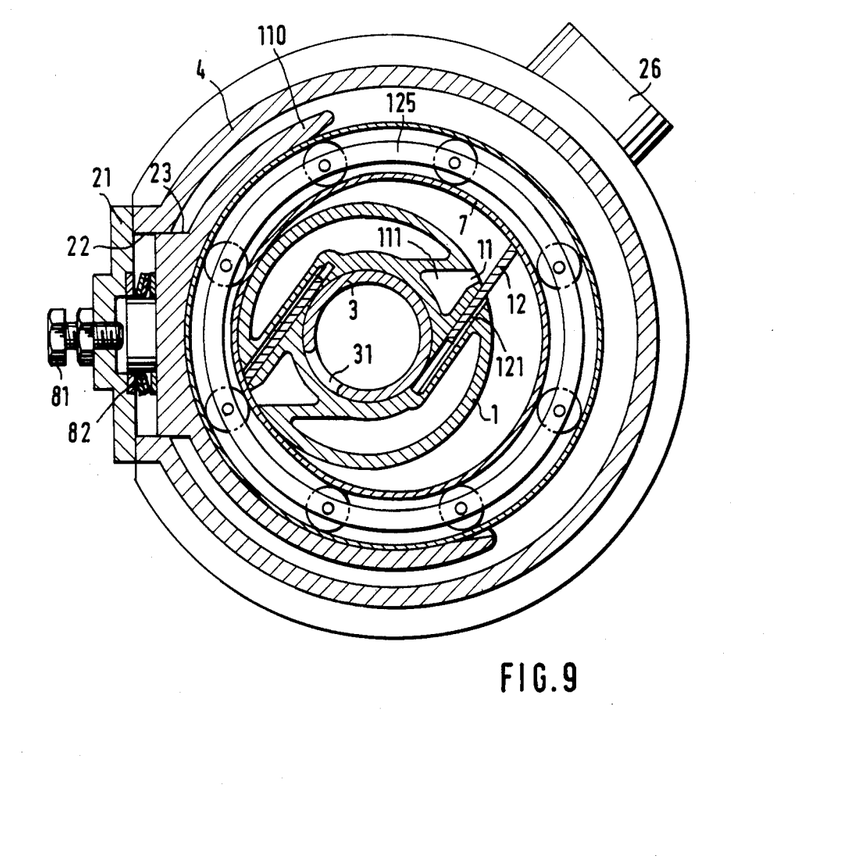
FIG. 9 shows a cross-section through an alternate embodiment wherein compressed fluid is exhausted through a control tube.

FIG. 9 shows a cross-section through another embodiment similar in many respects to FIG. 8, but modified to use the operating principles of FIGS. 1, 2 and 3. In stationary housing 4, there is a circular bore 22, which is arranged for mounting the tenon 23 of the semicircular bearing support body 110. The bearing support body 110 is mounted pivotably and radially displaceably in this bore 22. By means of plate springs 82, the roller bearing 125 is force-keyed with the rotary sleeve 7 against the rotor 1 by pressure, in such a way that the rotary sleeve 7 embraces or wraps around the rotor 1 approximately 60°. Resilient return movements due to the pressure of compression can be limited by means of an adjusting screw 81.

The housing 4 is closed by the closure cover 21. Alignment errors are compensated for by the pivotable mounting of the bearing support 110 in the bore 22. When a compressor is utilized according to the compression mechanism of FIGS. 1, 2, and 3, as shown in FIG. 9, deviating from FIG. 8, the machine is especially suitable for oil injection.

Figure 10:
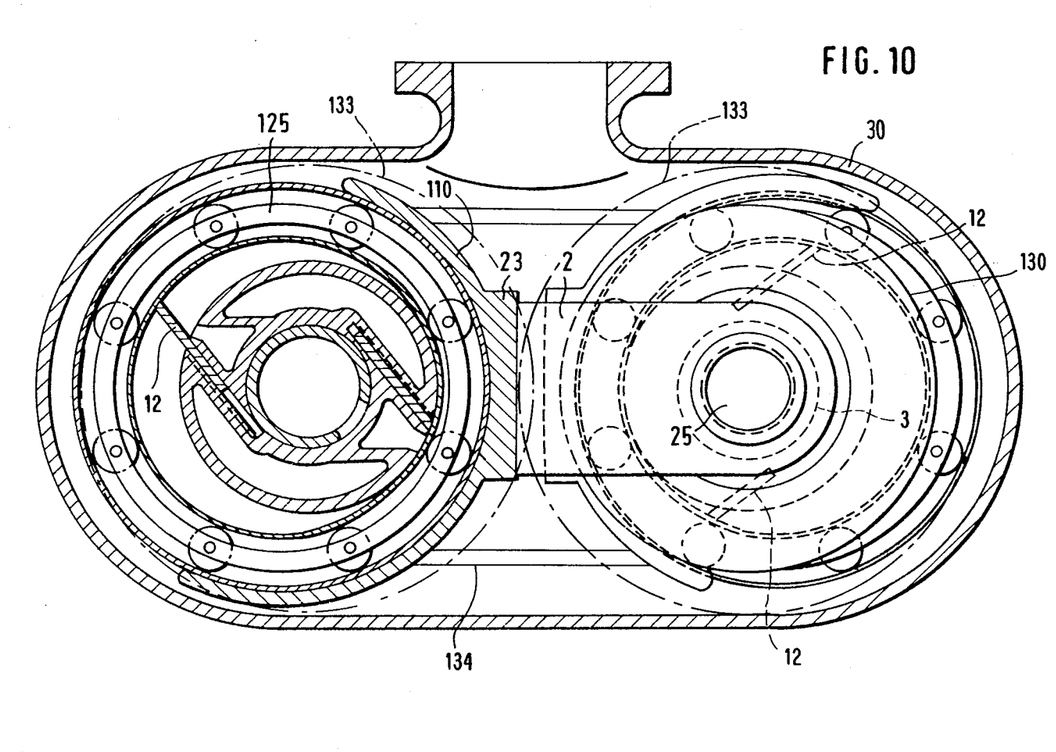
FIG. 10 shows a tandem arrangement of two machines.

FIG. 10 shows a pairwise arrangement of a compressor according to the compression mechanism of FIGS. 1, 2 and 3 in a suction housing 30 with a suction fitting 25. Two compressors are disposed with the end faces 23 of the bearing support bows 110 joined together. One element is driven by means of a flanged shaft 6 (FIG. 8) outside of the suction housing and itself drive the second compressor element in the same direction of rotation via a belt 134. Opposing directions of rotation for the two compressor elements can be achieved by providing interengaging gear represented by broken line 133 teeth on two rotor flanges 130. By displacing the separator slides 12 at approximately 90° to each other, four compressions occur per revolution, which leads to a further reduction of the pulsation.

The intake capacity of a compressor in the illustrated size amounts to approximately 360 m³/hour at 10,000 revolutions.

Figure 11:
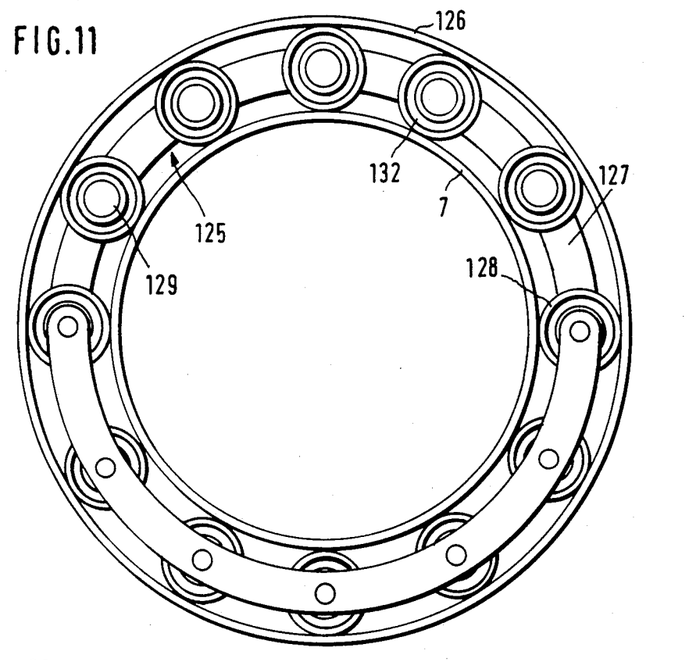
FIGS. 11 through 15 show a drive turbobearing.
Figure 12:
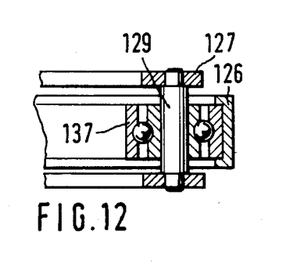
Figure 13:
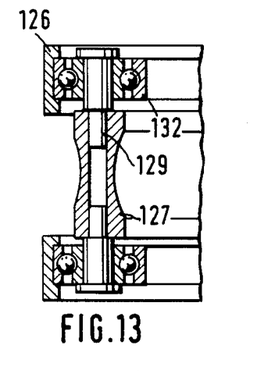

FIGS. 11 through 13 show the turbobearing for achieving the high rotational speeds allowed by the compressor system. The bearing 125 comprises a thin-walled cylindrical outer ring 126, which adjusts itself to the configuration of the bearing support bow 110. Distributed around the circumference in the annular space between the outer ring 126 and the rotary sleeve 7 are standardized roller bearings, which are held in spaced relation by laterally positioned elastic guide rings 127 and shafts 129.

Figure 14:
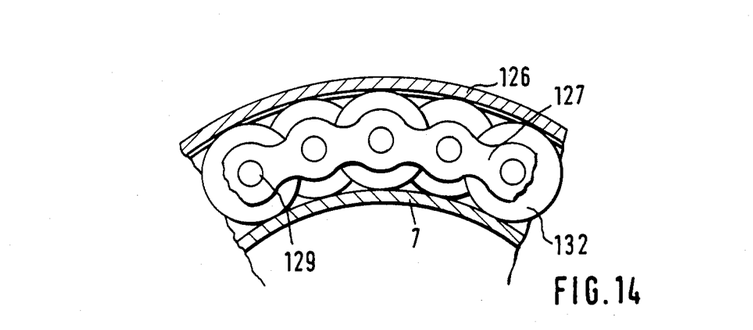
Figure 15:
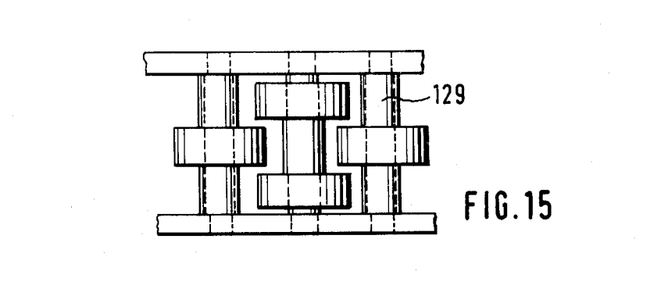

The radial forces Fr generated by the pressure applied by the bearing support bow and by compression are oppositely oriented and load the outer ring of the roller bearing 132 without significant force on the rollers of the bearing 132. The number of bearings 132 depends on the size of the load. The bearing can be constructed with a single row (FIG. 12), a double row (FIG. 13) or at higher loads with a comb-like intermeshed arrangement (FIGS. 14 and 15). The usefulness of this bearing, which can be economically manufactured, is not limited to use in a compressor. By use of laterally closed standard bearings, oil-free operation can be assured.

The limiting speed of rotation of the turbo bearing is 2-3 times higher than the limiting speed of rotation of cage-guided standard bearings with the same dimensions.

FIGS. 14 and 15 show a partial sectional view of a turbo bearing with comb-like (intermeshing) offset roller bearings.

Figure 16:
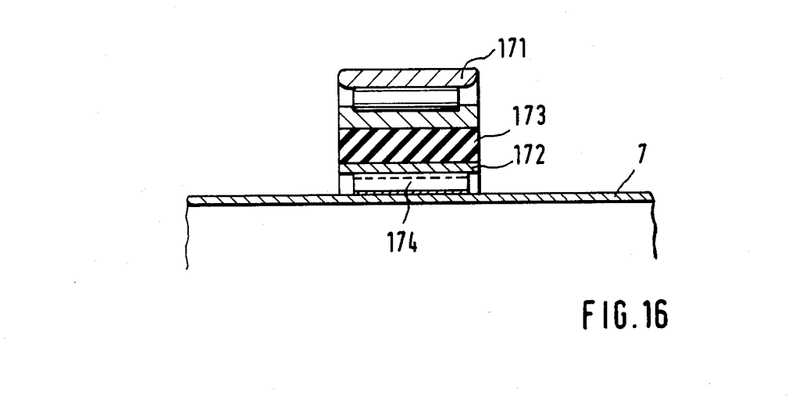
FIG. 16 shows an arrangement of a standard bearing for lower speeds of rotation.

FIG. 16 shows the arrangement of a standard roller bearing on the rotary sleeve as it can be constructed for speeds of rotation up to about 4000. The inner ring of the needle bearing 171 is vulcanized onto a thin-walled support ring 172, which is secured on the rotary sleeve 7 under tension by means of tolerance springs 174. The tolerance springs 174 are constructed wave-shaped or zig-zag in form. The inner ring of the roller bearing 171 is fixed axially on the rotary sleeve 7 by the compressive force of the tolerance springs. The rubber ring 173 is separated from the warmer surface of the rotary sleeve 7 by the annular gap between support ring 172 and rotary sleeve 7. Cooling air can be supplied at the same time. In this embodiment the roller bearing 171 is not deformed; the resilience effect occurs through the rubber ring 173.

Figure 17:
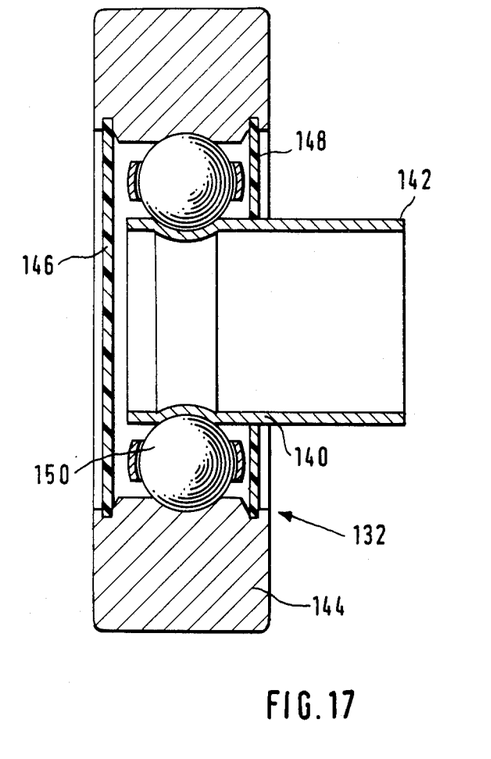
FIG. 17 shows a preferred embodiment of the inner roller bearing of the support bearing.

FIG. 17 shows a preferred embodiment of the bearing 132 of the support turbo bearing 125. In this case the aforementioned shaft is formed as a thin-walled hollow shaft having a free end 142 which projects outwardly out of the bearing and which is received in a bore in an elastic guide ring, not shown here in further detail. The roller elements 144 are also designed as ring-form rollers in this embodiment of the inner roller bearing. In comparison to massive or solid balls or cylindrical rollers, annular or ring-form roller elements constructed as described are resiliently deformable. The return forces resulting from the hollow shaft 140 according to the invention are small, and the deformability of the ring-form roller elements can be utilized without imposing too great of requirements on the manufacturing tolerances. The elastically resilient guide ring can further press the ring-form roller elements with a radial stress against the outer deformable support or bearing ring. Altogether, a deformable support bearing with extremely low coefficients of friction is created in an optimum fashion. All of the inner roller bearings are correspondingly provided with sealing plates 146 and 148 in accordance with FIG. 17, so that a functionally reliable lubrication of the inner roller bodies 150 is assured. The roller elements 144 as well as the bearing rings or support rings ar ventilated without any problem, and a reliable removal of heat directly out of the region of the bearing also is assured. The temperature increase is substantially smaller than when conventional bearings are utilized.

Figure 18:
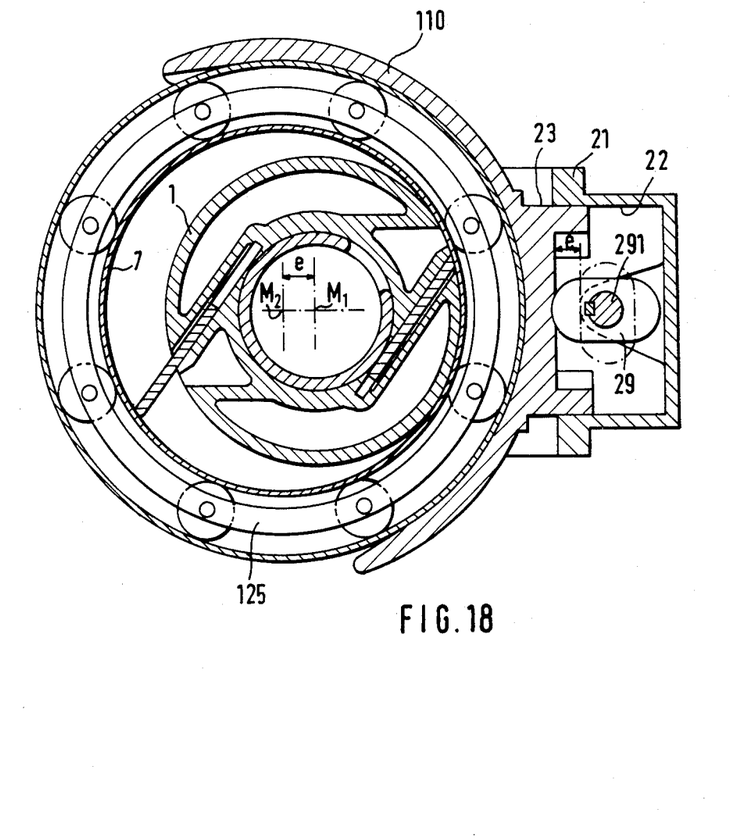
FIG. 18 shows a machine with control for running without load.

FIG. 18 shows a cross-section through a machine with a control for running without load. In connecting a displacement machine there arise, among other things, problems, since the opposing pressure immediately arises. Especially in connecting an already rotating drive, for example by means of a clutch, shock-like loads arise.

This can be avoided by displacing the bearing support bow 110, together with the rotary sleeve 7 and the bearing 125 so far to the right until the center point M2 nearly coincides with the center point M1 of the rotor. A workload-free annular space thereby is created between rotor 1 and rotary sleeve 7.

This can be achieved by means of an eccentric member 29, which is mounted with a shaft 291 pivotably in a housing 21. The housing 21 is flanged together with the bearing support bow 110. The mounting tenon 23 of the bearing support bow 110 is displaceably arranged in the bore 22.

After pivoting of the eccentric member by approximately 90°, the centrifugal force displaces the separator slide 12 and the gas forces displace the rotary sleeve with the bearing support bow 110 to the right by approximately the amount e up to a predetermined stop. The power requirement for running without load then corresponds to the small bearing losses.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. An apparatus for compressing and conveying fluids, comprising a rotor which rotates about an axis, a thin-walled, deformable rotary sleeve which is rotatably arranged eccentrically to the rotor axis in surface to surface engagement with the circumferential surface of the rotor throughout a predetermined angular range $\phi$, and at least one separator slide defining working chambers which vary in volume when said rotary sleeve is rotated, wherein said rotary sleeve is supported by at least one bearing in a bearing support and is pressed by said bearing support against the circumferential surface of said rotor so that said rotor is partially embraced cylindrically by said sleeve in said predetermined angular range $\phi$, wherein said rotor rotates around a control tube and contacts the inner surface of said rotary sleeve throughout said predetermined angular range φ, and wherein said rotary sleeve is drivable by said rotor through frictional engagement.

2. An apparatus according to claim 1, wherein said bearing is deformably constructed and has a resilient guide ring for guiding ring-form roller elements which are mounted by means of inner bearings on shafts which are secured in said guide ring.

3. An apparatus according to claim 2, wherein said shafts are hollow shafts.

4. An apparatus according to claim 1, wherein said bearing support is open at the side turned away from said predetermined angular range φ.

5. An apparatus according to claim 1, wherein said predetermined angular range φ is approximately 60° in size.

6. An apparatus according to claim 1, wherein said bearing support has a radius of curvature in said predetermined angular range with a center which coincides with the axis of rotation of said rotor, and wherein said bearing support is approximately semicircular and the further course of curvature of said bearing support outside said predetermined angular range substantially corresponds to the natural curvature of said deformable rotary sleeve.

7. An apparatus according to claim 1, wherein two opposing separator slides are guided in corresponding slots in said rotor extending tangentially to said control tube, and said slots each have a radially inwardly oriented opening to the control tube.

8. An apparatus according to claim 1, wherein said control tube has a radial opening, and said rotor has an opening directly behind each separator slide which is closed by said rotary sleeve when said rotor is rotated through an angle which substantially corresponds to said predetermined angular range.

9. An apparatus for compressing and conveying fluids, comprising a rotor which rotates about an axis, a thin-walled, deformable rotary sleeve which is rotatably arranged eccentrically to the rotor axis in surface to surface engagement with the circumferential surface of the rotor throughout a predetermined angular range φ, and two opposing separator slides defining working chambers which vary in volume when said rotary sleeve is rotated, wherein said rotary sleeve is supported by at least one bearing in a bearing support and is pressed by said bearing support against the circumferential surface of said rotor so that said rotor is partially embraced cylindrically by said sleeve in said predetermined angular range φ, wherein said rotor rotates around a control tube and contacts the inner surface of said rotary sleeve throughout said predetermined angular range φ, wherein said rotary sleeve is drivable by said rotor through frictional engagement, wherein said two opposing separator slides are slidingly received in corresponding slots in said rotor extending tangentially to said control tube, said slots each having a radially inwardly oriented opening to the control tube, and wherein said control tube has a radial opening which is formed and arranged such that after completion of a pressure operation and at the onset of compression the rear edge of the opening from one separator slide slot to the control tube cuts across the forward edge of the radial opening in the control tube, and further the forward edge of the opening from the other separator slide slot crosses the rear edge of the radial opening in the control tube to thereby open the control tube opening in accordance with a predetermined pressure condition.

10. An apparatus according to claim 1, wherein said control tube is pivotably arranged in a housing.

11. An apparatus according to claim 1, wherein said bearing support is fixedly secured to a housing so that the bearing support cannot rotate.

12. An apparatus according to claim 7, wherein said control tube is a suction tube provided on one side with perforated inlet openings, and wherein the apparatus is controlled by openings in the rotor in such a way that at maximum intake and the onset of compression on the suction side the inlet openings of the control tube are closed by the rear edge of a rotor opening, and on the pressure side backflow is prevented by pressure valves arranged in said rotor and which rotate therewith.

13. An apparatus according to claim 12, wherein said pressure valves are arranged in cylindrical bores in said rotor directly in front of said separator slides.

14. An apparatus according to claim 1, wherein compressed fluid exits from a compression chamber through a pressure valve which rotates with the apparatus and opens into an annular space between a rotor flange and a shaft flange, and wherein a closed, stationary housing encloses said apparatus, and said housing is provided with a pressure outlet fitting on the opposite side from the pressure valve opening, so that fluid flows spirally across said housing to said outlet fitting.

15. An apparatus according to claim 1, wherein said bearing support is rotatably and radially displaceably mounted in a bore in a surrounding housing, and wherein radial displacement of said bearing support is limited by means of an externally adjustable stop.

16. An apparatus according to claim 1, wherein said rotary sleeve is pressed against said rotor by means of a spring acting on said bearing support.

17. An apparatus according to claim 1, wherein said rotary sleeve is radially displaceable in such a way that the center of the rotary sleeve substantially coincides with the center of the rotor in order to control the apparatus to run without load.

18. An apparatus according to claim 1, wherein two machines are arranged in one housing, each machine comprising a bearing support having an outer face and a rotor with a pair of separator slides, wherein the outer face of the bearing support of each machine is connected to the outer face of the bearing support of the other machine, wherein the rotor of one of said machines drives the rotor of the other machine, and wherein the separator slides of one machine are displaced by approximately 90° with respect to the separator slides of the other machine.

19. An apparatus according to claim 18, wherein the rotor of one machine drives the rotor of the other machine in the same rotational direction by means of a belt drive.

20. An apparatus according to claim 18, wherein the rotor of one machine drives the rotor of the other machine in the opposite rotational direction by means of intermeshing gear teeth on flanges on the rotors.

21. An apparatus for compressing and conveying fluids, comprising a rotor which rotates about an axis, a thin-walled, deformable rotary sleeve which is rotatably arranged eccentrically to the rotor axis in surface to surface engagement with the circumferential surface of the rotor throughout a predetermined angular range φ, and at least one separator slide defining working chambers which vary in volume when said rotary sleeve is rotated, wherein said rotary sleeve is supported by at least one bearing in a bearing support and is pressed by said bearing support against the circumferential surface of said rotor so that said rotor is partially embraced cylindrically by said sleeve in said predetermined angular range $\phi$, wherein said rotor rotates around a control tube and contacts the inner surface of said rotary sleeve throughout said predetermined angular range $\phi$, wherein said rotary sleeve is drivable by said rotor through frictional engagement, and wherein said sleeve supporting bearing comprises an outer ring member, an inner ring member and a plurality of roller members on shaft members distributed circumferentially around an annular space between said inner and outer ring members, at least one of said inner and outer ring members being thin-walled and deformable, said roller members being rotatably mounted on said shaft members by means of inner roller bearings, and said roller members and shaft members being held in spaced relation to each other by means of an elastically resilient guide ring.

22. An apparatus according to claim 21, wherein said inner ring member simultaneously serves as said rotary sleeve.

23. An apparatus according to claim 1, comprising a roller bearing with an inner ring vulcanized to a thin-walled support ring, and wherein said support ring is disposed around said rotary sleeve and is held in a fixed axial position on said sleeve by pressure applied by tolerance rings interposed between the sleeve and the support ring.

24. Apparatus for compressing and conveying a fluid comprising a cylindrical rotary piston which is eccentrically arranged in a housing and is rotatably mounted therein, a rotary sleeve excentrically surrounding said rotary piston in said housing supported by means of a bearing, said rotary sleeve being frictionally driven by said rotary piston, and separator slides which contact said rotary sleeve and are retractable into slits in said rotary piston, said separator slides separating chambers traversed by said fluid between said rotary piston and said rotary sleeve from each other, wherein said rotary piston is rotatably mounted around a control tube extending through said housing, said rotary sleeve is supported through a predetermined angular range in a bearing support bow by means of a deformable roller bearing, said rotary sleeve cylindrically encloses said rotary piston in said predetermined angular range, and the center of curvature of said bearing support bow coincides with the axis of rotation of said rotary piston.

25. An apparatus according to claim 1, wherein said rotor contains at least one inner opening on its inner surface communicating with a separator slide slot in said rotor in which one separator slide is slidingly recieved, and wherein a channel is provided extending along said separator slide, said channel communicating at a radially inward end with said inner opening of said rotor, and said channel opening at a radially outward end through the outer surface of said rotor.

26. An apparatus according to claim 25, wherein said rotor has two inner openings in its inner surface each communicating with a separator slide slot in which a separator slide is received, and a channel communicating between one of the inner openings of the rotor and the outer surface of the rotor is provided extending along each separator slide.

27. An apparatus according to claim 26, wherein said control tube is provided with a single radial opening through which communication is provided between the interior of said control tube and said working chambers via said channels whenever one of said inner openings at least partially overlaps with said radial opening.

28. An apparatus according to claim 26, wherein two axial passages are formed in said rotor, each passage having a slot communicating therewith formed in the rotor outer surface on the opposite side of each separator slide from the radially outward end opening of each channel.

29. An apparatus according to claim 25, wherein said rotor has a cylindrical inner surface which surrounds the outer surface of said control tube so that essentially no communication exists between the interior of said control tube and said channel throughout an angular range of rotation of said rotor of more than 180 degrees.

* * * * *